United States Patent Office 2,787,806
Patented Apr. 9, 1957

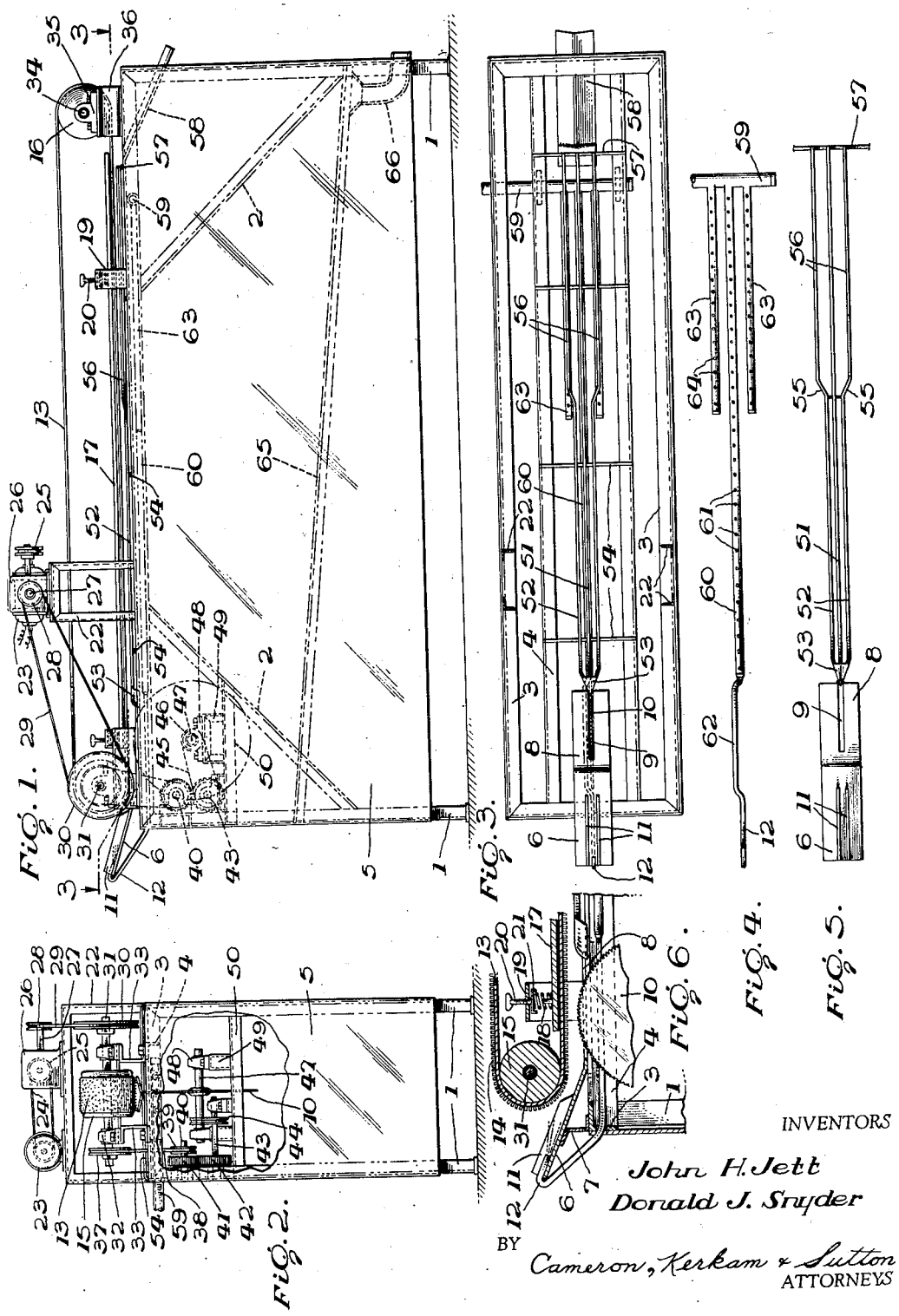

2,787,806

GIZZARD CLEANING MACHINE

John H. Jett and Donald J. Snyder, Fayetteville, Ark., assignors of fifty percent to General Foods Corporation, New York, N. Y., a corporation of Delaware, and fifty percent to C. A. Swanson & Sons, Omaha, Nebr., a corporation of Nebraska Application March 19, 1953, Serial No. 343,462

9 Claims. (Cl. 17—11)

The present invention relates to apparatus for the preparation for consumption of the gizzards of various species of fowl such as chickens, turkeys, geese, ducks, guineas and the like.

The gizzard is a more or less elongated digestive organ that is roughly spheroidal in shape and has entrance and exit openings for the passage therethrough of food consumed by the fowl. The walls of the gizzard include heavy muscular masses and various digestive glands which make up the edible portion, the inner lining comprising a tough layer or sack which is practically inedible. During the life of the fowl, the food which it ingests is vigorously compressed and massaged in the gizzard by the repeated contractions of its muscular walls, and a grinding effect is obtained due to the presence in the gizzard of small stones, sand and gravel, the food materials being thus prepared for the further digestive process which they undergo after passing from the gizzard to other organs of the fowl. In preparing such gizzards for human consumption, they must first be cut open and their contents then removed, including food materials, gravel, and the like, and the present invention is directed particularly to apparatus for performing these operations. Subsequently the tough inner lining must always be removed, but machines for this purpose are already known and in use in the industry.

In preparing gizzards by hand, their shape and somewhat rubbery and slippery condition make them rather difficult to hold and cut, and unless the cut is made properly, the contents of the gizzard may not be completely removed, or they may be discharged over and contaminate the edible portion so that additional cleaning of the latter is required. For such reasons manual handling and processing of gizzards are uneconomical, if not impracticable, for commercial purposes.

The chief object of the present invention is to provide a machine capable of cutting or slitting gizzards and washing out their contents by mechanical means, with resultant increase in the number of gizzards handled and decrease in unit processing costs. To these ends the invention comprises a machine to which gizzards are fed in succession and in which said gizzards, as they move through the machine, are automatically cut or slit on their lower sides, then spread outwardly to release and discharge their contents downwardly, and while still spread open are washed out by jets or streams of a suitable cleaning liquid, usually water.

One embodiment of the invention has been illustrated in the accompanying drawings, but it is to be expressly understood that said drawings are for purposes of illustration only and are not to be taken as a definition of the limits of the invention, reference being had to the appended claims for this purpose. In said drawings, Fig. 1 is a side view of the machine;

Fig. 2 is an end view of Fig. 1;

Fig. 3 is a plan view taken on the line 3—3 of Fig. 1, parts being omitted for the sake of clarity of illustration;

Fig. 4 is a detail of the water spraying system;

Fig. 5 is a detail of part of the conveying means; and

Fig. 6 is a sectional detail showing the arrangement of parts at the entrance end of the machine.

It will be understood that apparatus embodying the invention can be mounted on any suitable framework. In the form shown, legs 1 of angle iron or the like are connected by side braces and struts 2 and support a rectangular top frame 3 and intermediate longitudinals 4. The lower part of the frame is preferably enclosed in a housing 5 of sheet metal or other suitable material, and it will be understood that if desired, the mechanism above the top frame 3 may likewise be enclosed in or covered by any suitable hood or the like (not shown).

Gizzards are fed by hand or otherwise to a feed chute or slide, the first part 6 of which is downwardly inclined and supported by a bracket 7 mounted on the top framework 3 mentioned above. Beyond this inclined portion, the feed slide extends approximately horizontally as shown at 8, this section being supported in any suitable manner such as that hereinafter described. The horizontal section 8 is slotted at 9 and the upper part of the periphery of a circular rotating knife 10 projects through the slot 9 so as to cut or slit the bottoms of the gizzards passing along the feed slide 6, 8. The inclined portion 6 of this slide can be shaped or otherwise constructed in any suitable manner so that gizzards placed thereon in a position or attitude desired for cutting will maintain that attitude as they slide down the incline to the knife. In the form shown, for example, guide plates or ribs 11 are secured to the surface of the incline, forming between them a trough-like slideway. Preferably the passage of the gizzards down this incline is facilitated by flushing it with water in any suitable manner, as by means of a small supply pipe 12.

Suitable means are provided for feeding the gizzards positively to the rotating knife 10 after they reach the bottom of the inclined slide. Preferably a feed belt operates above and in conjunction with the slideway 6, 8 to engage the gizzards on the slide and advance them positively through the machine. As shown in Fig. 6, for example, a continuous flexible belt 13 of any suitable material is provided with small projecting fingers 14 of rubber-like material, this belt turning around a drive pulley or drum 15 and its lower reach being located sufficiently close to the slideway and knife to accomplish the desired purpose. The belt 13 extends continuously around a drum 16 at the other end of the machine, and preferably its lower reach is held down resiliently by suitable means such as a pressure plate 17 engaged by springs 18 that are interposed between said plate and brackets 19 mounted on the top framework 3 at suitably spaced points. Preferably the springs 18 are adjustable by suitable means such as the screws 20 threaded in the brackets 19 and carrying spring seats 21 for the upper ends of the springs.

Any suitable means can be provided for operating the belt 13 and the knife 10. As shown by way of example, a platform 22 is mounted on the top framework 3 and straddles the upper reach of the belt 13. An electric motor 23 is mounted on this platform and is connected by a belt 24 with the drive pulley 25 of a reduction gear box 26. The output shaft 27 of this gear box carries a pulley 28 driving a belt 29 and pulley 30 on the shaft 31 of the belt pulley 15 mentioned above. As shown in Fig. 2, this shaft 31 is mounted in pillow blocks 32 supported by brackets 33 mounted on the longitudinal members 4 of the top framework. The other belt pulley 16 need not be driven; its shaft 34 may be mounted in pillow blocks 35 carried by brackets 36 similar to the brackets 33 mentioned above.

Through suitable connections, the knife 10 may also be driven by the motor 23 mentioned above. For example, the belt drive shaft 31 carries pulley 37 which drives a belt 38 and pulley 39 on the shaft 40 of one of a pair of transfer gears 41, 42. The shaft 43 of the gear 42 carries a pulley 44 driving a belt 45 and a pulley 46 on the shaft 47 of the knife 10. This shaft can be mounted conveniently in pillow blocks 48 carried by frame members 49, 50.

After passing over the knife 10 and reaching the end of the slide 6, 8, the slit gizzards move on through the machine on a slideway formed by spaced rods which permit the downward discharge of the contents of the gizzard and also the washing out of the gizzard by means of suitable water sprays. For these purposes, moreover, the supporting rods are arranged so that they enter the cut made by the knife 10 and then spread apart the two parts of the gizzard divided by the cut. Preferably and as shown most clearly in Fig. 5, at least three such rods are employed. The intermediate rod 51 extends longitudinally and approximately horizontally in line with the knife 10. The two outer rods 52 are joined with the intermediate rod 51 to form a sort of plow point 53 secured to the end of the slide 8 by soldering or otherwise in position to enter the cuts made by the knife 10. This connection serves also to support the end of the slide 8, the rods themselves being supported by rods 54 extending transversely between the longitudinal frame members 4. For a certain distance, the outer rods 52 may be substantially parallel with the intermediate rod 51, the gizzards being spread open to a limited extent during their passage along these parallel sections to discharge a large part of their contents by gravity. Toward the exit end of the machine, however, additional spreading is desirable in order to facilitate complete cleaning. To this end the outer rods 52 (or if desired additional rods) are inclined both outwardly and upwardly as shown at 55 and thereafter extend parallel to the intermediate rod as shown at 56. All of the rods terminate at a transverse support 57 beyond which the cleaned gizzards drop into a downwardly inclined discharge chute 58 at the exit end of the machine.

As stated above, suitable means are provided for subjecting the cut and spread-open gizzards to jets or streams of washing liquid such as water. Preferably and as shown most clearly in Fig. 4, a supply header 59 is connected to a pipe 60 having upwardly directed openings 61 and extending longitudinally underneath the intermediate rod 51 throughout substantially its entire length. The streams of water from the openings 61 thus enter the open cuts in the bottoms of the moving gizzards and facilitate the discharge of their contents during the early part of their travel beyond the knife 10, these streams also assisting to wash out the gizzards during the latter part of their travel through the machine. For convenience, the washing water pipe 12 mentioned above may be an extension of the pipe 60, being bent laterally at 62 to avoid the knife 10. During the latter part of the travel of the gizzards, especially after they have been spread fully open by the rod sections 56, it is desirable to provide water sprays in addition to those emerging from the openings 61. To this end relatively short pipes 63 extend from the header 59 on either side of the pipe 61 and approximately beneath the rod sections 56, these pipes 63 having upwardly directed openings 64.

Any suitable arrangement may be provided to take care of the washing water and material discharged from the gizzards. For example, a pan 65 extends between the side plates of the housing 5, being inclined downwardly toward one end of the machine and provided with a discharge drain 66.

The knife 10 should rotate relatively slowly as otherwise wear may be excessive due to the presence of grit in the gizzard; also too rapid rotation tends to gouge and move the gizzards out of position in the trough. Otherwise considerable latitude is permissible in the size of the machine and the dimensions and speed of operation of the parts. As an example, good results have been obtained in the case of chicken gizzards under the following conditions: linear speed of belt about 0.3 ft. per second, the belt being 13 ft. long and making a complete revolution in about 44 seconds; knife diameter between 6 in. and 12 in. and knife speed about 73 R. P. M.; rate of feed about 40 gizzards per minute. Considerable variation of these conditions was permissible, however; for example, increasing or decreasing the speed of the belt by 10% did not interfere with efficient operation. Still wider variations may be desirable in handling gizzards from other varieties of fowl, as for example turkey gizzards which are much larger than chicken gizzards.

It will be understood, therefore, that the invention is not restricted to the above stated details of operation. Further, it will now be evident to those skilled in the art that various changes can be made in the form, details of construction, and arrangement of the parts without departing from the spirit of the invention. Reference should therefore be had to the appended claims for a definition of the limits of the invention.

What is claimed is:

1. A machine for cleaning gizzards comprising a feeding means engaging and advancing gizzards in succession along a path of travel through the machine, a cutting device located below said path of travel in position to be engaged by the advancing gizzard and to slit open their lower sides, spreading means located in said path of travel beyond said device and having a point-like end arranged to enter the cuts in the advancing gizzards and laterally diverging portions to spread apart the two sections of said gizzards on either side of the cuts as said gizzards continue to advance along said path of travel, and a liquid spray device extending longitudinally beneath said path of travel for washing out the interiors of said gizzards while still held open by said spreading means.

2. A machine as defined in claim 1, said spreading means comprising spaced rods supporting the gizzards for sliding movement, the outer rods having parallel portions and then diverging from one another and also being inclined upwardly at a point in said path of travel subsequent to said laterally diverging portions.

3. A machine as defined in claim 1, said spray device comprising a pipe extending longitudinally beneath the path of travel of the gizzards and having a plurality of upwardly directed openings arranged to project liquid streams into the gizzards opened by said spreading means.

4. A machine for cleaning gizzards comprising a gizzard feed chute, a plurality of spaced rods extending beyond said chute and providing a sliding support for said gizzards, a traveling pressure means engaging and moving said gizzards along said chute and rods, a slitting knife projecting through said chute by an amount such as to slit open the gizzards, said rods having ends forming a point located to enter the cuts made by said knife and the rods diverging from said point to spread the gizzards further open, and spray means located beneath said rods for directing water streams into the spread-open gizzards moving along said rods.

5. A machine as defined in claim 4, said pressure means comprising an endless belt having a plurality of projecting fingers of rubber-like material to engage and advance said gizzards.

6. A machine as defined in claim 4, the ends of said rods being joined together and to the end of said chute at a point in line with said knife.

7. A machine as defined in claim 4, comprising at least three rods including an intermediate rod extending approximately in line with said knife, and side rods diverging from said point and also being elevated relative to said intermediate rod toward the exit end of the machine.

8. A machine as defined in claim 4, comprising a rod extending approximately in line with said knife, and side rods diverging from said point on either side of said first rod, then extending parallel to said first rod, and then further diverging and simultaneously inclining upwardly toward the exit end of the machine.

9. A machine as defined in claim 8, said spray means comprising a pipe having upwardly directed openings and extending longitudinally beneath said first rod, and side pipes extending longitudinally beneath the elevated portions of said side rods and also having upwardly directed openings.

References Cited in the file of this patent
UNITED STATES PATENTS

| | | |
|---|---|---|
| 550,986 | Lowry | Dec. 10, 1895 |
| 1,479,104 | Lytle | Jan. 1, 1924 |
| 2,455,675 | Hawk | Dec. 7, 1948 |
| 2,641,020 | Clemens et al. | June 9, 1953 |
| 2,663,899 | Biddinger et al. | Dec. 29, 1953 |
| 2,695,418 | Patterson et al. | Nov. 30, 1954 |
| 2,707,303 | Terry et al. | May 3, 1955 |